US010465915B2

(12) United States Patent
Bach

(10) Patent No.: US 10,465,915 B2
(45) Date of Patent: Nov. 5, 2019

(54) CONTROL KNOB WITH OPTICAL SHAFT ENCODER AND VISUAL FEEDBACK OF ANGULAR POSITION

(71) Applicant: Haier US Appliance Solutions, Inc., Wilmington, DE (US)

(72) Inventor: James Carter Bach, Seymour, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 364 days.

(21) Appl. No.: 15/203,842

(22) Filed: Jul. 7, 2016

(65) Prior Publication Data

US 2018/0010932 A1 Jan. 11, 2018

(51) Int. Cl.
| | |
|---|---|
| *F24C 3/12* | (2006.01) |
| *G01D 5/347* | (2006.01) |
| *F24C 7/08* | (2006.01) |
| *G01D 5/34* | (2006.01) |
| *G01D 5/40* | (2006.01) |

(52) U.S. Cl.
CPC .............. *F24C 3/124* (2013.01); *F24C 7/082* (2013.01); *G01D 5/342* (2013.01); *G01D 5/3473* (2013.01); *G01D 5/34792* (2013.01); *G01D 5/40* (2013.01)

(58) Field of Classification Search
CPC ......... F24C 3/124; F24C 7/082; G01D 5/342; G01D 5/3473; G01D 5/34792; G01D 5/40
USPC .......................................................... 99/331
See application file for complete search history.

(56) References Cited

U.S. PATENT DOCUMENTS

| | | | | |
|---|---|---|---|---|
| 5,351,161 A | * | 9/1994 | MacKay | .................. G05G 1/08 360/137 |
| 7,978,186 B2 | | 7/2011 | Vassallo et al. | |
| 2002/0003206 A1 | * | 1/2002 | Culver | ............... G01D 5/34723 250/221 |
| 2005/0164623 A1 | * | 7/2005 | Huynh | ................. H03K 17/941 454/69 |
| 2009/0047841 A1 | * | 2/2009 | Morey | ..................... G01R 1/04 439/676 |
| 2011/0061489 A1 | * | 3/2011 | Bulin | ....................... G05G 1/12 74/553 |

(Continued)

FOREIGN PATENT DOCUMENTS

| | | | |
|---|---|---|---|
| CN | 204257473 | * | 4/2015 |
| DE | 102004013947 | * | 12/2005 |
| DE | 102004013947 B3 | | 12/2005 |

*Primary Examiner* — Dana Ross
*Assistant Examiner* — Joseph W Iskra
(74) *Attorney, Agent, or Firm* — Dority & Manning, PA

(57) ABSTRACT

A control knob assembly for a consumer appliance is provided. The control knob assembly provides a compact means for determining the angular position of the control knob and illuminating a plurality of indicators to communicate that angular position to a user of the appliance. More specifically, the control knob assembly includes an optical encoder disc that defines a plurality of teeth that are in operable communication with a plurality of optical sensors. The position of the sensors and the spacing of the plurality of teeth are configured to generate signals as the control knob is rotated that allow for the precise determination of the angular position of the control knob. Moreover, the optical encoder disc may fit inside a lighting assembly and may have a low profile, resulting in a compact control knob assembly that may easily fit within the area underneath the control knob and control panel.

20 Claims, 7 Drawing Sheets

(56) References Cited

U.S. PATENT DOCUMENTS

2014/0021024 A1   1/2014   Heimann et al.

* cited by examiner

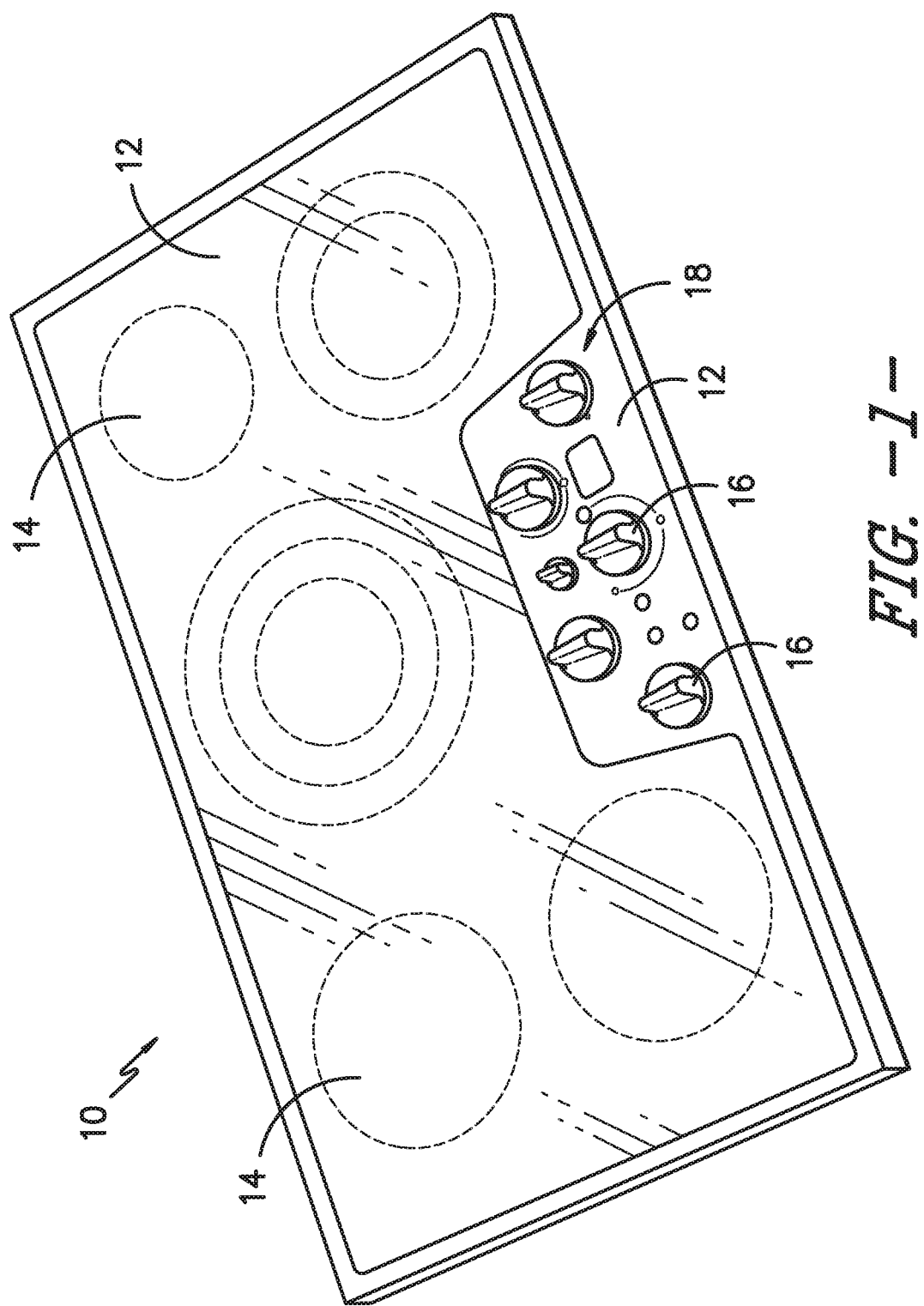
FIG. -1-

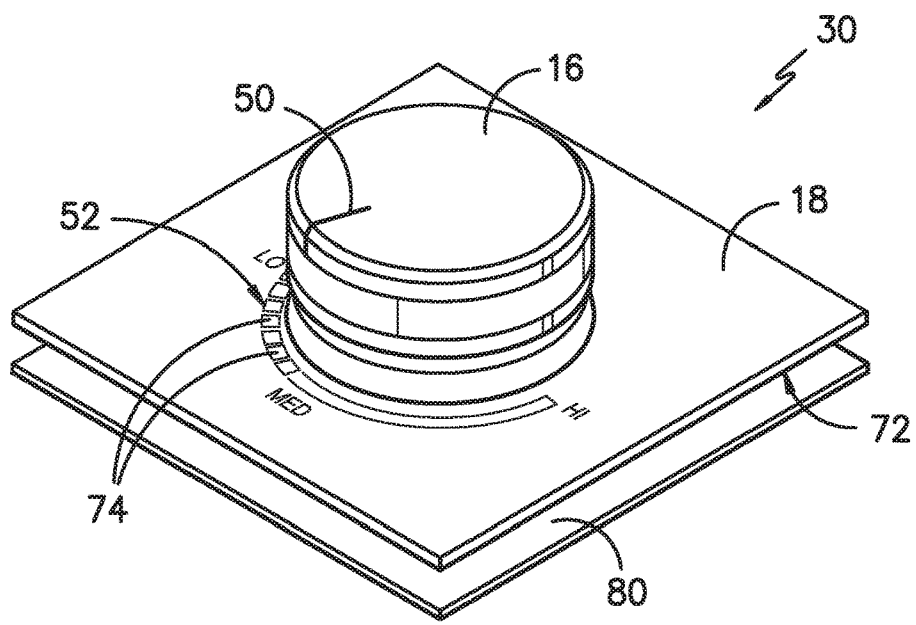
FIG. -2-
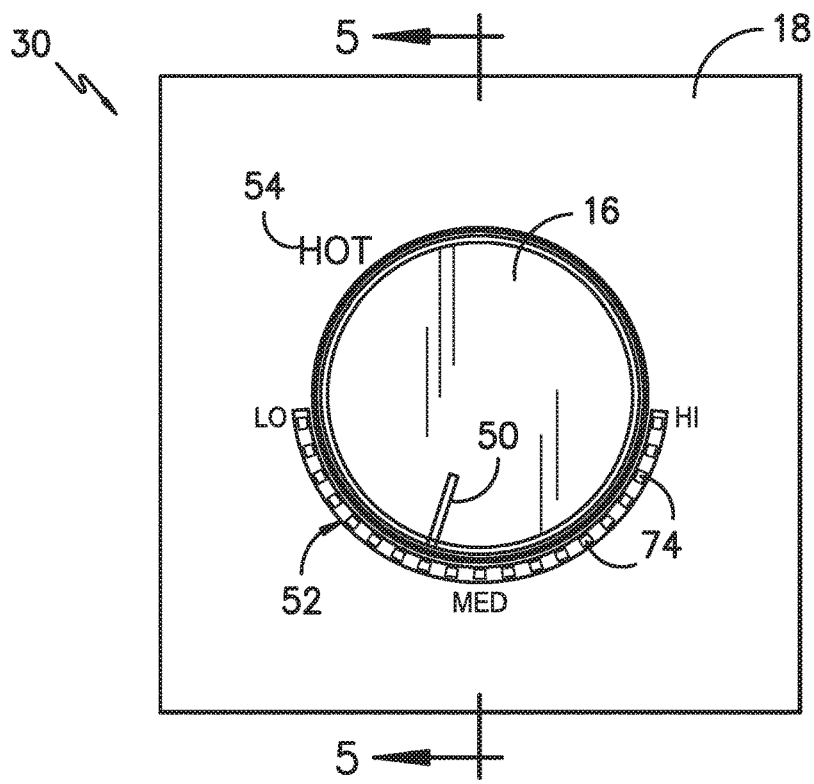
FIG. -3-

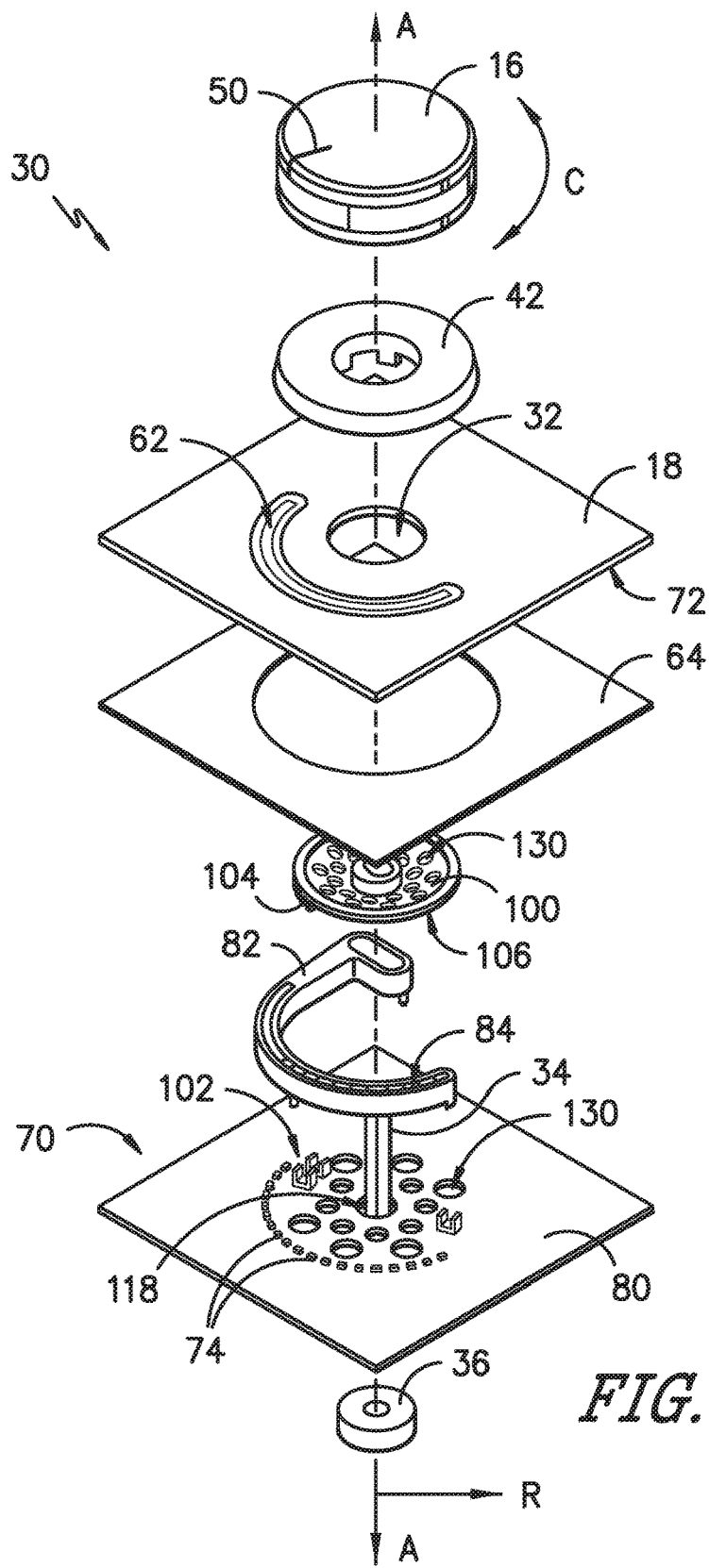
FIG. -4-

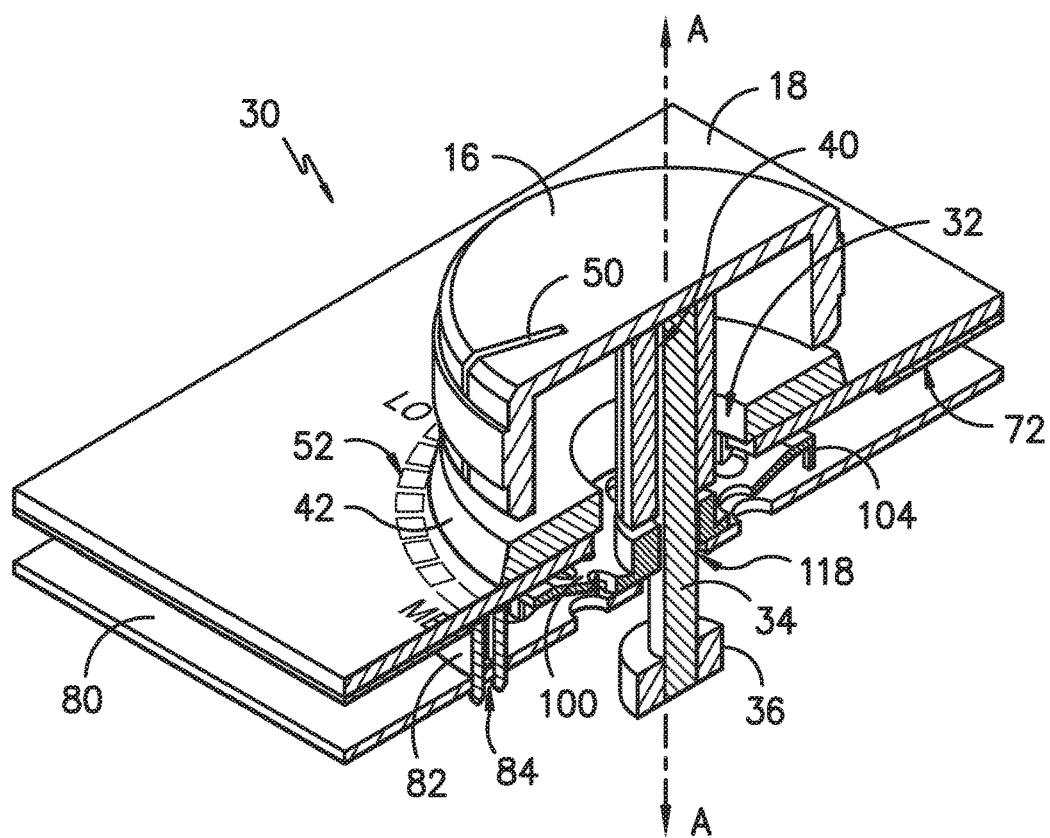
FIG. -5-
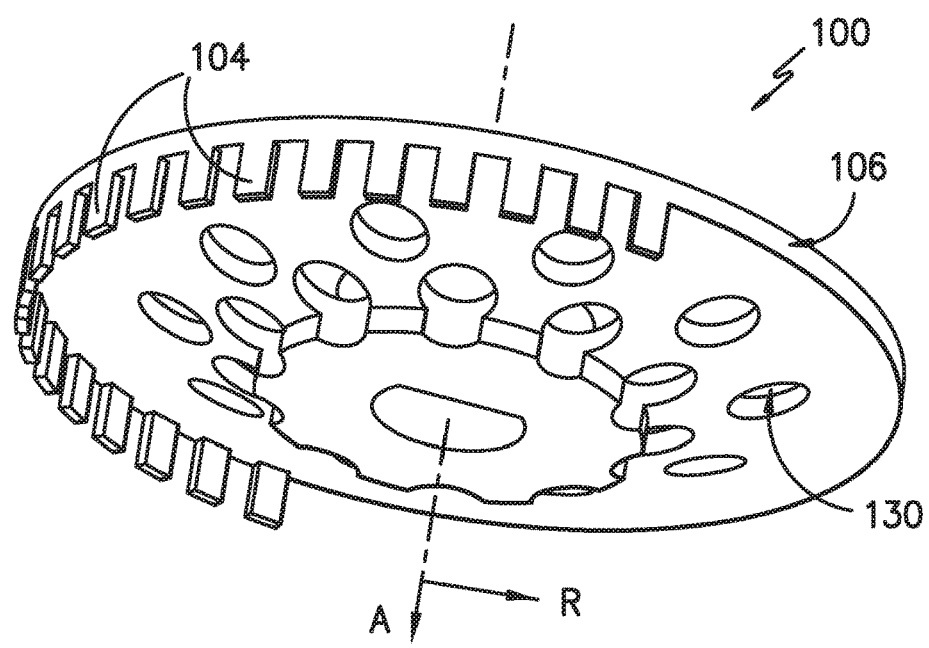
FIG. -6-

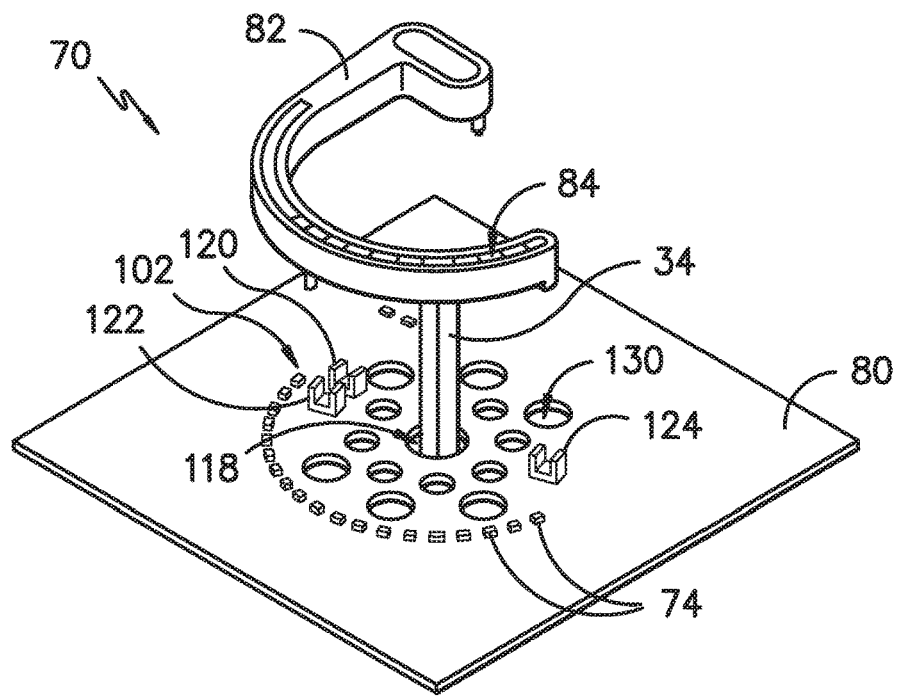
FIG. -7-
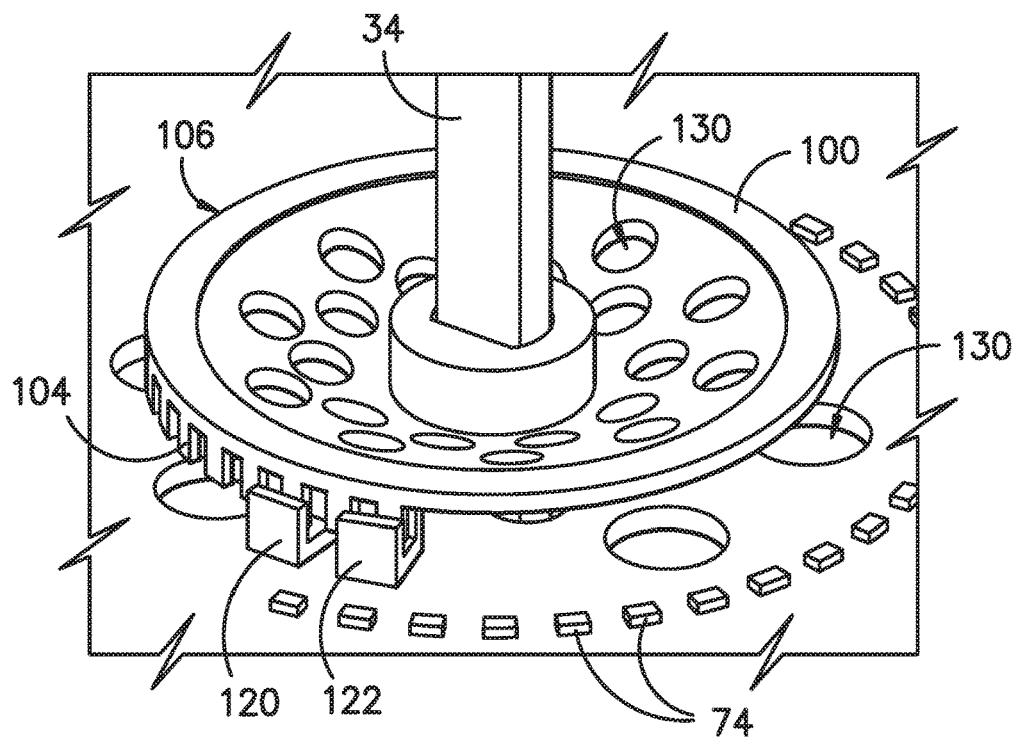
FIG. -8-

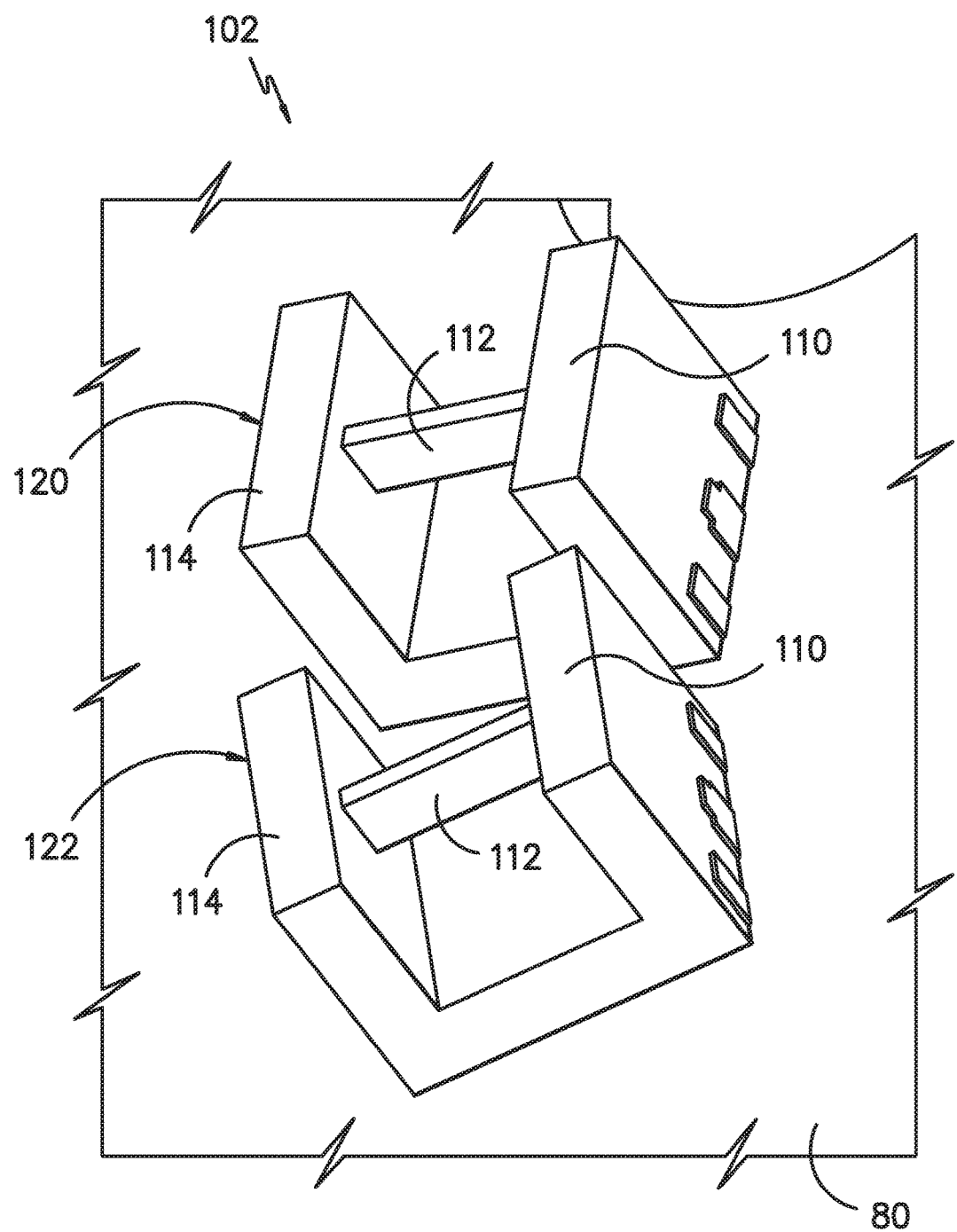
FIG. -9-

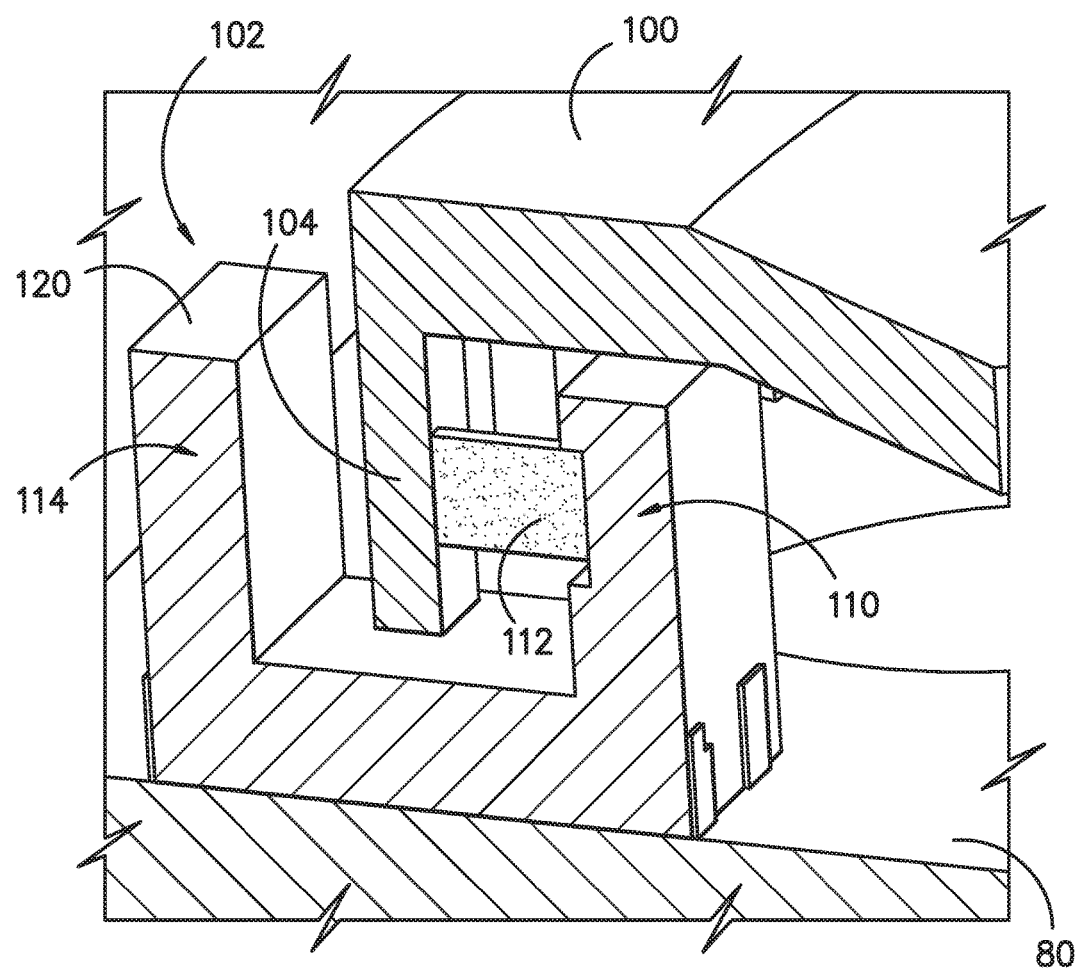
FIG. -10-

CONTROL KNOB WITH OPTICAL SHAFT ENCODER AND VISUAL FEEDBACK OF ANGULAR POSITION

FIELD OF THE INVENTION

The present subject matter relates generally to consumer appliances and more particularly to a system for illuminating control knobs or graphics surrounding the control knobs of consumer appliances.

BACKGROUND OF THE INVENTION

Control knobs are commonly used on a variety of commercial and residential appliances to control an operating condition of the appliance. Control knobs are particularly common on cooking appliances, such as stoves or cooktops. Various shapes and sizes can be used depending upon, e.g., the intended application, aesthetics, and other factors.

For example, cooktops traditionally have at least one heating element positioned at a cooktop surface for use in heating or cooking an object, such as a cooking utensil, and its contents. The at least one heating element may heat a cooking utensil directly through induction heating, or may use another heat source such as electrically resistant coils or gas burners. Control knobs are typically used to adjust the power level of the heating element—and thus the amount of heat delivered by the heating element. In other appliances, e.g., ovens, washing machines, clothes dryers, etc., control knobs are often used to select an operating mode of the appliance, such as "bake" or "broil" for ovens, "cotton" or "permanent press" for clothes dryers, etc. Often the position of the control knob, and thus the operating mode or power level setting it controls, is not readily visible to a user of the appliance from a distance, for example, across the kitchen from the dining room.

To provide a user with easily visible feedback regarding the setting of the power control and thus the power being supplied to the heating element, cooktops with electronic controls, e.g., touch-sensitive controls, generally include a display for communicating to the user a status of the heating element. For example, displays may typically include a plurality of LED indicators that are mounted on a control panel and illuminated to indicate the setting of the power control of the appliance. Often this display is in to form of "7-segment" numerals, indicating the power level as "L", "0", "1", . . . "9" to "H"; it is often difficult for a consumer, especially one with visual impairment, to distinguish these digits from a distance or from an off-axis viewing angle. Worse yet are cooktops with control knobs, which, generally, only provide a painted or engraved "pointer" line along the edge of the knob, which requires the operator to be in close proximity to the cooktop to determine the position of this "pointer" relative to the markings printed on the control panel below. These are extremely difficult to see from a distance, especially if the "pointer" marking is on the side of the knob opposite the operator of the cooktop. For this reason, it would be advantageous to provide an electronically illuminated indication of the knob's angular position, which could be seen from a farther distance (and over a wider range of viewing angles) than the current implementation.

Determining the angular position of the control knob typically requires measuring the rotation of a stem extending from the control knob, or the rotation of a control shaft (e.g., from a gas flow valve within the appliance) which extends upwards into the stem of the knob. Typically, appliances use a rotary position sensor positioned underneath the control panel that directly connects to and/or extends from the control knob stem. However, methods of illuminating the control knob or surrounding areas typically require the placement of a light source and/or light guide directly underneath the control panel near the control knob. Complicated lighting systems or rotary position sensor arrangements may be required to fit both of these components in the minimal space available within the appliance underneath the control panel. In the case of a gas cooktop, the control shaft is part of the gas valve assembly, and the shaft encoder must be something which can be added-to the system without disturbing the existing system, i.e., the shaft must extend through the encoder.

Certain types of appliances, such as gas cooktops, often require the ingestion of air into the appliances for the purposes of gas burner combustion. Often an electric appliance requires the ingestion of air for the cooling of electrical components within the chassis of the appliance. In such appliances the only practical inlet of said air is through a gap between the knob stem (or gas valve shaft) and the opening in the control panel. The inclusion of traditional optical shaft encoders and optical components for illuminating the graphics around the control knob are generally not conducive to adequate airflow for the appliance.

Accordingly, a consumer appliance having a control knob with an improved knob illumination assembly is desirable. More particularly, a control knob assembly that can accurately illuminate a portion of the consumer appliance to provide an easily visible indication of the angular position of the control knob and status of the heating element (or other functionality) while minimizing the amount of space required underneath a control panel of the consumer appliance would be particularly beneficial. Additionally, it would be particularly beneficial if the control knob angular position sensing and graphical illumination subsystem was arranged in such a way that little hindrance of airflow was encountered.

BRIEF DESCRIPTION OF THE INVENTION

The present subject matter provides a control knob assembly for a consumer appliance having a compact means for determining the angular position of the control knob and illuminating a plurality of indicators to communicate that angular position to a user of the appliance. Additionally, the topology presented by the present subject matter provides for minimal restriction of airflow through the control knob assembly. More specifically, the control knob assembly includes an optical encoder disc that defines a plurality of teeth that are in operable communication with a plurality of optical sensors. The position of the sensors and the spacing of the plurality of teeth are configured to generate signals as the control knob is rotated that allow for the precise determination of the angular position of the control knob. Moreover, the optical encoder disc may fit inside a lighting assembly and may have a low profile, resulting in a compact control knob assembly that may easily fit within the area underneath the control knob and the control panel. Furthermore, the optical encoder disc and the printed circuit board (PCB) on which the optical sensors and lighting assembly are placed are perforated with a plurality of apertures to allow minimally restricted airflow through the control knob assembly. Additional aspects and advantages of the invention will be set forth in part in the following description, or may be apparent from the description, or may be learned through practice of the invention.

In one exemplary embodiment, a control knob assembly for a consumer appliance is provided. The control knob assembly includes a panel defining an aperture and a control knob including a stem defining an axial direction and a radial direction, the stem extending through the aperture of the panel. An encoder disc is operably coupled to the stem, such that the panel is positioned between the control knob and the encoder disc, the encoder disc defining a plurality of teeth. A sensor assembly is mounted adjacent the encoder disc such that the sensor assembly detects the movement of the plurality of teeth to determine the angular position of the stem.

In another exemplary embodiment, a cooking appliance is provided. The cooking appliance includes a cooking surface including a heating source, a control panel defining an aperture, and a control knob assembly for selectively adjusting the amount of heat delivered by the heating source. The control knob assembly includes a printed circuit board defining an aperture and a control knob including a stem defining an axial direction and a radial direction, the stem extending through the aperture of the control panel and the aperture of the printed circuit board. An encoder disc is operably coupled to the stem, the encoder disc being positioned between the control panel and the printed circuit board, the encoder disc defining a plurality of teeth. A plurality of sensors are mounted on the printed circuit board adjacent the encoder disc such that the plurality of sensors detect the motion of the plurality of teeth to determine the angular position of the stem.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of a cooktop appliance according to an exemplary embodiment of the present subject matter.

FIG. 2 provides a perspective view of a control knob assembly that may be used with the exemplary cooktop appliance of FIG. 1 according to an exemplary embodiment of the present subject matter.

FIG. 3 provides a top view of the exemplary control knob assembly of FIG. 2.

FIG. 4 provides an exploded perspective view of the exemplary control knob assembly of FIG. 2.

FIG. 5 provides a cross sectional view of the exemplary control knob assembly of FIG. 2, taken along Line 5-5 of FIG. 3.

FIG. 6 provides a bottom perspective view of an optical encoder disc of the exemplary control knob assembly of FIG. 2.

FIG. 7 provides a perspective view of an optical sensor assembly mounted to a printed circuit board of the exemplary control knob assembly of FIG. 2.

FIG. 8 provides a perspective view of the optical encoder disc engaging the optical sensor assembly according to an exemplary embodiment of the present subject matter.

FIG. 9 provides a perspective view of optical sensors of the optical sensor assembly of FIG. 7.

FIG. 10 provides a close-up perspective view of one of a plurality of teeth of the optical encoder disc engaging one of the optical sensors of the optical sensor assembly according to an exemplary embodiment of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure relates generally to a system for illuminating control knobs or the surfaces surrounding control knobs on a consumer appliance. Although a cooktop appliance 10 is used below for the purpose of explaining the details of the present subject matter, one skilled in the art will appreciate that the present subject matter may apply to any other suitable consumer appliance. For example, the exemplary control knob assemblies described below may be used on other types of cooking appliances, such as ranges or oven appliances, or on dishwashing appliances, washing machines, clothes dryers, or any other consumer appliance that operates at least in part based on user input through a control knob. Cooktop appliance 10 is used in the discussion below only for the purpose of explanation, and such use is not intended to limit the scope of the present disclosure in any manner.

FIG. 1 illustrates an exemplary embodiment of a cooktop appliance 10 of the present disclosure. Cooktop appliance 10 may be, e.g., fitted integrally with a surface of a kitchen counter, may be configured as a slide-in cooktop unit, or may be a part of a free-standing range cooking appliance. Cooking appliance 10 includes a cooktop surface 12 having one or more heating source, such as heating elements 14 for use in, e.g., heating or cooking. Heating elements 14 may be various sizes, as shown in FIG. 1, and may employ any suitable method for heating or cooking an object, such as a cooking utensil (not shown), and its contents. In one embodiment, for example, heating element 14 uses a heat transfer method, such as electric coils or gas burners, to heat the cooking utensil. In another embodiment, however, heating element 14 uses an induction heating method to heat the cooking utensil directly.

Cooktop surface 12, as used herein, refers to any upper surface of cooking appliance 10 on which utensils may be heated and therefore food cooked. For example, the present disclosure contemplates exemplary embodiments where cooktop surface 12 is comprised of one material proximate to heating elements 14 and another material proximate to control knobs 16. According to alternative embodiments, the entirety of cooktop surface 12 is comprised of a single suitable material. In one exemplary embodiment, cooktop surface 12 is comprised of ceramic glass. In other embodiments, however, cooktop surface 12 may be comprised of another suitable material, such as a metallic material (e.g., steel) or other suitable non-metallic material.

According to the illustrated exemplary embodiment, control knobs 16 may be located within a control panel 18 of cooktop appliance 10. However, one skilled in the art will appreciate that this location is used only for the purpose of explanation, and that other locations and configurations of control knobs 16 are possible and within the scope of the present subject matter. Indeed, according to alternative embodiments, control knobs 16 may instead by located on cooktop surface 12, on a vertical surface of cooktop appliance 10, e.g., on a backsplash, front bezel, or any other suitable surface of cooktop appliance 10.

Referring now generally to FIGS. 2 through 10, a knob assembly 30 that may be used with cooktop appliance 10 will be described in more detail. Although the discussion below refers to an exemplary knob assembly 30, one skilled in the art will appreciate that the features and configurations described may be used for other knob assemblies in other cooking appliances or consumer appliances as well. For example, knob assembly 30 may be positioned elsewhere within cooktop appliance 10, may have different components or configurations, and use alternative mechanisms for illuminating knob or the region surrounding the knob. Other variations and modifications of the exemplary embodiment described below are possible, and such variations are contemplated as within the scope of the present subject matter.

Control knob assembly 30 may include control knob 16 that is manipulated by a user for regulating the amount of heat delivered by a corresponding heating element 14 on cooktop surface 12. As used herein, control knob 16 may refer to any configuration of rotary dial, and not just one having a circular base, as shown in FIG. 1. For example, the present disclosure contemplates exemplary embodiments wherein knobs 16 have a rectangular base, an oval base, or any other shape having one or more curved lines, straight lines, or both. Furthermore, although control knob 16 is illustrated as controlling the power level of heating element 14 of cooktop appliance 10, one skilled in the art will appreciate that aspects of the present disclosure may be used to control alternative operating conditions on other appliances. For example, according to alternative embodiments, control knob 16 may be used to regulate a wash time on a washing machine or to select a wash cycle on a dishwasher.

As best illustrated in FIGS. 4 and 5, control panel 18 may define an aperture 32 through which control knob 16 may be operably coupled with components positioned underneath control panel 18 through, e.g., a control knob shaft or a stem 34. More specifically, control knob 16 may be positioned on or coupled to stem 34 of a heating element controller 36 such that rotating knob 16 a certain amount in a circumferential direction C rotates stem 34 the same amount in the circumferential direction C, thereby controlling heating element controller 36. As illustrated, heating element controller 36 is an electronic regulator, e.g., an infinite switch that controls the amount of electrical power delivered to heating element 14. According to alternative embodiments, e.g., where control knob assembly 30 is used to control a gas cooktop, heating element controller 36 may be a gas valve for regulating the flow rate of gas delivered to a gas burner for combustion.

According to the illustrated embodiment, aperture 32 is a circular hole in control panel 18. However, according to alternative embodiments, aperture may be any suitable size or shape and may be positioned in any suitable surface of cooktop appliance 10. In order to provide a seal between control panel 18 and stem 34, e.g., to prevent spills and debris from entering the interior portion of control panel through aperture 32, a grommet (not shown) may be received into aperture 32 and may be configured to snugly receive stem 34 while still allowing for its rotation. For example, a grommet may be made of a resilient material, such as a natural or synthetic rubber. These grommets are commonplace with electronic cooktops, as liquid intrusion is destructive to electronic components; however, they typically are not used in gas cooktops where the ingestion of combustion air is required.

According to the illustrated embodiment, stem 34 is received in a receiving boss 40 defined at the center of control knob 16. Stem 34 extends from control knob 16 through the center of aperture 32 in a substantially orthogonal direction relative to the surface of control panel 18. Receiving boss 40 may have a D-shaped cross section that is configured to receive stem 34, which has a corresponding D-shaped profile. In this manner, stem 34 is securely received by control knob 16 and rotates precisely with control knob 16 with little or no lag. According to the illustrated embodiment, control knob 16 is removably attached to stem 34, e.g., for easy cleaning. However, according to alternative embodiments, stem 34 may be integrally formed with control knob 16. It should be noted that while the D-shaped stem 34 profile is illustrated in this discussion, other shapes may be used so long as they rotationally link control knob 16 and stem 34.

According to the illustrated embodiment, control knob 16 is elevated relative to cooktop surface 12. However, in other embodiments, control knob 16 may be positioned such that a bottom surface of control knob 16 is immediately adjacent cooktop surface 12, i.e., is not elevated relative to cooktop surface 12. As illustrated, control knob assembly 30 further includes a bezel 42 that sits flush on surface of control panel 18 between control panel 18 and control knob 16 when it is in the installed position. Bezel 42 is substantially the same diameter as control knob 16 and may be constructed from the same material to provide an aesthetically pleasing appearance. In addition, bezel 42 may provide an easy to clean surface that prevents food particles from entering aperture 32. However, bezel 42 is an optional component, and is not necessary for the present invention to function; it is strictly provided for visual appeal to the consumer.

Control knob 16 may define a knob indicator 50 that is intended to provide the user with a visual indication of the power level of heating element 14. For example, knob indicator 50 may be an indicator line defined on control knob 16 and configured to correspond to an absolute angular position of control knob 16. However, in order to provide a more easily visible indicator of the power level of heating element 14, control panel 18 may define additional indicators.

For example, control panel 18 may define a plurality of power level indicators 52, which may be an array of indicators positioned on control panel 18 adjacent a periphery of control knob 16. In this regard, power level indicators 52 may form an arc of indicators that are progressively illuminated as the power level of control knob 16 is increased from the "off" position to the maximum power level. According to the illustrated embodiment, power level indicators 52 form a semi-circular arc adjacent control knob 16. However, according to alternative embodiments, power level indicators 52 may form a complete circle around control knob 16, and may have different sizes, shapes, configurations, and colors.

In addition to knob indicator 50, various additional indicators can be used to provide an indication when heating element 14 has reached various temperature thresholds. For example, as shown in FIG. 3, a hot indicator 54 may be illuminated when the temperature of heating element 14 has reached a temperature that is unsafe for human contact, e.g., 120 degrees Fahrenheit. One skilled in the art will appreciate that the illustrated power level indicators 52 and threshold indicator 54 are only used for the purpose of explanation. Other configurations and additional indicators are possible and within the scope of the present subject matter.

As explained above, according to the exemplary embodiment, power level indicators 52 and a threshold indicator 54 may be illuminated to provide a highly visible indication to the user of the particular position of control knob 14 and the temperature of heating element 14. According to the illustrated embodiment, illumination of these indicators 52, 54 is achieved by defining indicators 52, 54 as transparent or translucent portions 62 (see FIG. 4) of control panel 18, which is otherwise made to be opaque (i.e., it does not transmit light) by virtue of an opaque masking material on its bottom surface as will be described below.

More specifically, according to the illustrated embodiment, surface of control panel 18 is constructed of transparent (clear or dark-tinted) glass or plastic material. In gas or electric coil cooktops, where the upper structure 64 of the appliance is typically constructed of metal, e.g., stainless steel or painted/enameled steel, control panel 18 could be made of either glass or plastic. In electric radiant or induction cooktops, where the upper structure 64 of the appliance is the actual cooking surface, control panel 18 would be the ceramic-glass cooking surface and therefore upper structure 64 shown in FIG. 4 would not exist. Therefore, in order to define precise areas of control panel 18 that transmit sufficient light to act as indicators 52, 54, an opaque backing material (masking layer) (not shown) may be printed on a bottom surface 72 of control panel 18 to define indicators 52, 54. As described below, a lighting assembly 70 is placed below control panel 18 to selectively illuminate indicators 52, 54. In other words, the printed opaque layer may define various apertures or openings, e.g., translucent portions 62, which allow light to travel through the glass control panel 18 and be visible to a user of cooktop appliance 10. Additionally, text or graphics may be printed within the clear openings of the opaque backing material such that they are visible when the indicators 52, 54 are illuminated. For example, the word "Hot" may be printed in the translucent portion 62 corresponding to the "hot surface indicator" 54, while numerals 1 thru 9 may be printed within the translucent portions 62 corresponding to the knobs rotary position. One skilled in the art will appreciate that other means of defining indicators 52, 54 are also possible and within the scope of the present subject matter. For example, according to alternative embodiments, a separate opaque panel that may be cut or stamped to define indicators 52, 54 may be attached to the underside of control panel 18.

As best shown in FIGS. 4 and 7, control knob assembly 30 may further include lighting assembly 70 for selectively illuminating indicators 52, 54. According to the exemplary embodiment, lighting assembly 70 is positioned at or adjacent bottom surface 72 of control panel 18. Lighting assembly 70 may include a light source configured for illuminating control knob 16 or a graphical display, e.g., indicators 52, 54 on control panel 18 to indicate the power level of heating element 14.

The light source of lighting assembly 70 may be any suitable light source or combination of light sources. For example, according to the illustrated embodiment, light source may include one light emitting diode (LED) 74, configured for illuminating as a single color, e.g., red, green, white, etc., or being capable of illuminating in more than one color, e.g., an R-G-B LED. As another example, light source may include more than one LED 74 and be capable of illuminating in different colors based on one or more operating conditions of heating element 14, cooktop appliance 10 or both. As yet another example, light source may be another electrical light source, such as one or more traditional light bulbs, e.g., grain of wheat bulbs, etc. It should be obvious to one skilled in the art that other arrangements of LEDs could be used at each light source 74 position of lighting assembly 70.

As shown, LEDs 74 may be distributed in a circular pattern on a printed circuit board 80 at or adjacent each of power level indicators 52. In addition, one or more LEDs 74 may be positioned under hot surface indicator 54. Printed circuit board 80, and thus LEDs 74, may be positioned beneath control panel 18 such that LEDs 74 may be configured for selectively illuminating indicators 52, 54 based on, e.g., one or more operating conditions or power levels of heating element 14. As best shown in FIGS. 2 and 3, LEDs 74 associated with power level indicators 52 may be distributed along the circumferential direction and may be spaced apart at a fixed radius that is larger than the radius of control knob 16. In this manner, power level indicators 52 may form an arc of LEDs 74 that are progressively illuminated as control knob 16 is rotate from the "off" position to the maximum heating position. It should be obvious to one skilled in the art that while the LEDs 74 are shown being mounted on the upper surface of printed circuit board 80, "reverse mount" LEDs may be mounted to the lower surface of PCB 80 with corresponding apertures in PCB 80 providing an optical path from the LEDs through PCB 80.

According to the exemplary embodiment, lighting assembly 70 may further include a light guide 82 positioned between control panel 18 and printed circuit board 80. Light guide 82 may be configured for directing and concentrating light emitted from each of the plurality of LEDs 74 to a corresponding indicator 52-54. According to one exemplary embodiment, light guide 82 may be comprised of an opaque material and configured with open air channels through which the light from LEDs 74 are constrained and directed to transparent region 62. Light guide 82 may also define one or more light pipes 84 comprised of a transparent material, a translucent material, or both. Each light pipe 84 may correspond with one of the plurality of LEDs 74 and may be configured to receive light from that LED 74 (or any other suitable light source) and transmit the light along the length of the corresponding light pipe 84 to precisely illuminate the corresponding indicator 52, 54. In this manner, a sharp, high-contrast graphical display may communicate the angular position of control knob 16 and the status of heating element 14 to the user.

Control knob assembly 30 may further include an optical encoder disc 100 and an optical sensor assembly 102 which together provide precise feedback regarding the angular position of stem 34, which may be communicated to the user by illuminating indicators 52. More specifically, as will be described in detail below, optical encoder disc 100 may be operably coupled to stem 34 and positioned adjacent an optical sensor assembly 102 and may be configured to break (or reflect) the optical signals emitted from one or more optical sensors to generate pulse signals which a controller may use to determine the angular position of optical encoder disc 100, and consequently, the angular position of control knob 16, stem 34, and heating element controller 36. According to an exemplary embodiment, the optical signals may be infrared light beams and optical encoder disc 100 may be constructed from an optically opaque material such that the rotation of optical encoder disc 100 intermittently blocks the transmission of the infrared beams. However, one skilled in the art will appreciate that optical encoder disc 100 may be made from any suitable material that is detectable by optical sensor assembly 102.

According to the illustrated embodiment, optical encoder disc 100 is a circular disc that is attached to stem 34 such that it rotates with stem 34 and control knob 16. As best shown in FIG. 4, stem 34 extends along and defines an axial direction A and optical encoder disc 100 extends along and defines a radial direction R such that optical encoder disc extends substantially perpendicularly relative to stem 34. Optical encoder disc 100 defines a plurality of teeth 104 that are in operable communication with optical sensor assembly. For example, the plurality of teeth 104 may extend from a circumference of optical encoder disc 100 and may extend along the axial direction A. Teeth 104 are generally fixed in size and spacing and define an arc at a fixed radius. As illustrated, teeth 104 extend from a perimeter 106 of optical encoder disc 100 away from control panel 18 and toward printed circuit board 80. However, one skilled in the art will appreciate other configurations of printed circuit board 80 and optical encoder disc 100 may be used, so long as teeth 104 are operably coupled with optical sensor assembly 102. In this manner, as optical encoder disc 100 rotates, teeth 104 may pass through and break the optical sensors mounted on printed circuit board 80 to generate the pulse signal. Notably, according to alternative embodiments, teeth 104 may extend from optical encoder disc 100 at any radial location. Moreover, according to some embodiments, multiple rows of teeth may be positioned at different radiuses and may be in operable communication with different optical sensor assemblies.

As best shown in FIGS. 7 and 8, optical sensor assembly 102 is mounted on printed circuit board 80. Printed circuit board 80 may be rigidly connected to control panel 18 such that the optical sensors do not move as control knob 16 and stem 34 rotate. Printed circuit board 80 may define an aperture 118 through which stem 34 may extend. According to the exemplary embodiment, printed circuit board 80 may be mounted to control panel 18 using any suitable mechanical fastener, such as screws, bolts, rivets, etc. Similarly, glue, bonding, snap-fit mechanisms, interference-fit mechanisms, or any suitable combination thereof be used to join printed circuit board 80 to control panel 18.

Optical sensor assembly 102 may include one or more optical sensors that are configured to detect the movement of teeth 104 of optical encoder disc 100. Although referred to herein as optical sensors for purposes of explaining exemplary embodiments of the present subject matter, one skilled in the art will appreciate that any suitable sensor may be used. More specifically, any sensor may have a detection point at which the sensor may detect the presence or absence of one of the plurality of teeth 104, as described in more detail below. For example, as best shown in FIGS. 9 and 10, an exemplary optical sensor may include an emitter that emits an optical signal and a detector that is configured to receive that optical signal. For example, according to the illustrated embodiment, an exemplary optical sensor may be an infrared sensor that comprises an infrared emitter 110 that emits an infrared light beam 112 toward an infrared detector 114. Optical encoder disc 100 is operably coupled with stem 34 such that teeth 104 are positioned between infrared emitter 110 and infrared detector 114 and freely move through each optical sensor of optical sensor assembly 102 as stem 34 rotates. When teeth 104 of optical encoder disc 100 pass through the exemplary optical sensor, each of the teeth 104 breaks the infrared light beam 112 from being received by infrared detector 114, thereby creating a pulse signal detected by a controller that may be mounted, for example, on printed circuit board 80. In this manner, teeth 104 may break infrared light beam 112 from each optical sensor (as described above) and the signal generated may be used to accurately determine the angular position of optical encoder disc 100, and thus control knob 16.

Although optical sensor assembly 102 is illustrated as including a plurality of vertically oriented slot interrupter sensors, one skilled in the art will appreciate that this is only an exemplary embodiment used for the purpose of explaining aspects of the present subject matter. Other optical sensor types and configurations may be used while remaining within the scope of the present subject matter. For example, optical encoder disc 100 may define a plurality of radially extending teeth that are operably coupled with one or more horizontally mounted slot interrupter sensors. Alternatively, one or more reflective optical sensors may be used to sense a plurality of reflective portions of an optical encoder disc as the disc rotates. Other configurations of optical encoder disc 100 and optical sensor assembly 102 are contemplated as within the scope of the present subject matter.

As shown in FIG. 7, optical sensor assembly 102 comprises a first optical sensor 120, a second optical sensor 122, and a third optical sensor 124. First optical sensor 120 generates a first pulse signal and is positioned adjacent second optical sensor 122 which generates a second pulse signal. Based on these two signals quadrature encoding may be used to determine both the incremental motion and direction of motion of optical encoder disc 100, as is known in the art. This information may be used to accurately determine the position of stem 34.

According to quadrature encoding, the first pulse signal (e.g., associated with first optical sensor 120) and the second pulse signal (e.g., associated with second optical sensor 122) are approximately 90 degrees out of phase from each other. This phase offset may be achieved by configuring the spacing of teeth 104 and the position of first optical sensor 120 relative to second optical sensor 122 such that a central portion of tooth 104 is positioned on the center of first optical sensor 120 while an edge of the same (or another) tooth 104 is positioned on the center of second optical sensor 122, thus causing the second pulse signal to change state. By determining which pulse signal is lagging the other, in other words, which signal is changing while the other signal is stable, the direction of rotation may be determined. For instance, if the first pulse signal is stable (i.e., center of a tooth centered on first optical sensor) and the second pulse signal is transitioning (i.e., edge of a tooth passing center of second optical sensor, thus changing state) then it can be determined that optical encoder disc 100 is turning in a first direction (e.g. clockwise) if the second pulse signal is changing from low to high (i.e., 0 to 1), or is turning in a second direction (e.g., counter-clockwise) if the second pulse signal is changing from high to low (i.e., 1 to 0). Likewise, the state transition of the first pulse signal can be used to determine the encoder's rotational direction while the second pulse signal is stable.

Optical sensor assembly 102 may further include third optical sensor 124, which is configured for detecting a first tooth from teeth 104 to indicate a zero position of control knob 16. In other words, third optical sensor 124 provides an absolute reference corresponding with control knob 16 being in the "off" position. First optical sensor 120 and second optical sensor 122 can be used to determine the incremental movement of control knob 16 and the direction of that movement, e.g., clockwise to increase heat and counter-clockwise to decrease heat. From a logic point of view, third optical sensor 124 is used to reset (set to zero) an up/down counter while first optical sensor 120 and second optical sensor 122 are used to generate "count up" or "count down" signals based on the quadrature encoding scheme described earlier. The up/down counter would be limited to count over the expected number of the rotational system. For instance, it could never count-down below 0, and it could never count-up above the number of positions control knob 16 is expected to represent.

Although three optical sensors 120-124 are described above, the size and spacing of teeth 104 and the number and location of optical sensors 120-124 may be configured differently in alternative embodiments. Indeed, any number, size, spacing, and configuration of teeth 104 and optical sensor assembly 102 may be used, such that teeth 104 and optical sensor assembly 102 are in operable communication and provide one or more signals to a controller that may use the signals to precisely determine the angular position of stem 34 and thus control knob 16. For example, a single optical sensor may be used to detect incremental rotation (speed) of control knob 16, two optical sensors may be used to detect both the direction and magnitude (speed) of the rotation of control knob 16, etc. Controller may then activate LEDs 74 of lighting assembly 70 to provide a user with an accurate indication of the power level setting of heating element 14. Optical sensor assembly 102 may include three optical sensors, although one skilled in the art will appreciate that more or fewer optical sensors may be used according to alternative embodiments and control algorithms.

While the present invention illustrates the third optical sensor as detecting the presence/absence of the first or last tooth of the plurality of teeth 104 also detected by the first and second optical sensors, one skilled in the art would recognize that the third optical sensor could, instead, be positioned at a different radial distance from the other two sensors, and therefore, could detect the presence/absence of a single tooth 104 (or a gap in a ring) positioned at a radius different than the plurality of teeth being detected by the other two sensors.

One skilled in the art would also recognize that other encoding schemes could be utilized, such as "greycode" or simple "binary-coded decimal", in which case optical encoder disc 100 would have multiple toothed rings, each passing through/by one of the sensors. The benefit of quadrature encoding is it minimizes the number of sensors, and the complexity of the encoder disc, while providing for a large number of sensed rotational positions (i.e., it can readily resolve a large number of positions around the knob with minimal complexity).

One skilled in the art would also recognize that in addition to optical encoding (as explained above) one could utilize magnetic encoding to perform the same functionality. In some situations, magnetic encoding might be advantageous over optical encoding, particularly where robustness to dirt, dust, or liquid intrusion is required (for instance, in a piece of industrial equipment). That is, rather than using an optical encoder disc and infrared optical sensors (whose performance is degraded in the presence of dust and certain liquids), one could use a ferrous (or magnetically polarized) encoder disc and magnetic sensors e.g. Hall Effect, Magneto-Resistive, Variable Reluctance, etc. In fact, one skilled in the art could conceive of potentially utilizing a combination of optical and magnetic detection schemes, for instance, using optical encoding to detect the rotation and a magnetic sensor to detect the "zero" position, or vice versa.

As illustrated in FIG. 4, printed circuit board 80 and optical encoder disc 100 define a plurality of apertures 130. Apertures 130 provide a path for air to circulate underneath control panel 18 and cooktop surface 12. This may be necessary for proper ventilation, e.g., of potential gas fumes that might otherwise be trapped underneath cooktop surface 12, or for cooling printed circuit board 80 or other components of cooktop appliance 10.

For example, as best shown in FIGS. 5 and 8, apertures 130 may place the space above control panel 18, the space between control panel 18 and printed circuit board 80, and the space below printed circuit board 80 in fluid communication with each other. In this regard, for example, air may flow from under printed circuit board 80, through apertures 130 in printed circuit board 80 to the space between control panel 18 and printed circuit board 80. Air may circulate within this space and may also flow through apertures 130 in optical encoder disc, through aperture 32 in control panel 18 and bezel 42, and to the area within control knob 16 and above control panel 18.

One skilled in the art will appreciate that apertures 130 are only one exemplary configuration and method of evacuating trapped gases. For example, optical encoder disc 100 and printed circuit board 80 may instead be configured to have a hub and spoke arrangement with large open areas between connected surfaces. Alternatively, according to some embodiments where fumes do not need to be vented, encoder disc 100 and printed circuit board 80 need not include apertures 130 at all.

One skilled in the art will appreciate that in addition to the configurations of knob assembly 30 described herein, alternative configurations of knob assembly 30 are possible and within the scope of the present subject matter. For example, although optical encoder disc 100 is positioned on stem 34 between printed circuit board 80 and control panel 18, it may be located elsewhere along stem 34. In addition, an alternative optical sensor assembly including more or fewer than three optical sensors may be used and different positioning algorithms may be used to determine the angular position of control knob 16. Moreover, the size, shape, and configuration of optical encoder disc 100 may be modified while remaining within the scope of the present subject matter. Other configurations are also possible.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control knob assembly comprising:
   a panel defining an aperture;
   a printed circuit board defining an aperture;
   a control knob comprising a stem defining an axial direction and a radial direction, the stem extending through the aperture of the panel and the aperture of the printed circuit board;

an encoder disc operably coupled to the stem, such that the panel is positioned between the control knob and the encoder disc, the encoder disc defining a plurality of teeth; and a sensor assembly mounted adjacent the encoder disc, the sensor assembly comprising a plurality of sensors for detecting the movement of the plurality of teeth to determine the angular position of the stem.

2. The control knob assembly of claim 1, wherein the sensor assembly is mounted on the printed circuit board.

3. The control knob assembly of claim 2, wherein the plurality of sensors comprises a first sensor and a second sensor, the first sensor producing a first pulse signal as the plurality of teeth pass a detection point of the first sensor and the second sensor producing a second pulse signal as the plurality of teeth pass the detection point of the second sensor, the first pulse signal being approximately 90 degrees out of phase from the second pulse signal.

4. The control knob assembly of claim 3, wherein the plurality of sensors further comprises a third sensor, the third sensor configured for detecting an indicator feature on the encoder disc, the indicator feature corresponding with a zero position of the control knob.

5. The control knob assembly of claim 4, wherein the encoder disc is made from a material which is detectable by first, second, and third sensors.

6. The control knob assembly of claim 4, wherein the first, second, and third sensors are each infrared optical sensors comprising an emitter that emits an infrared light beam and a detector that receives the infrared light beam and detects the presence and absence of a tooth of the plurality of teeth of the encoder disc at a detection point of the sensor.

7. The control knob assembly of claim 2, further comprising a lighting assembly mounted on the printed circuit board and configured to selectively illuminate a plurality of indicators defined on the panel.

8. The control knob assembly of claim 7, wherein each of the plurality of indicators is a translucent opening in the panel, each of the plurality of indicators corresponding to an angular position of the control knob.

9. The control knob assembly of claim 7, wherein the lighting assembly comprises a plurality of light sources, each of the plurality of light sources being configured to illuminate one of the plurality of indicators.

10. The control knob assembly of claim 9, further comprising a light guide positioned between the lighting assembly and the panel, the light guide configured for directing light from each of the plurality of light sources to a corresponding one of the plurality of indicators.

11. The control knob assembly of claim 1, wherein at least one of the encoder disc and the printed circuit board define a plurality of apertures to provide for an airflow path through the control knob assembly.

12. A cooking appliance, comprising:
a cooking surface including a heating source;
a control panel defining an aperture; and
a control knob assembly for selectively adjusting the amount of heat delivered by the heating source, the control knob assembly comprising:
  a printed circuit board defining an aperture;
  a control knob comprising a stem defining an axial direction and a radial direction, the stem extending through the aperture of the control panel and the aperture of the printed circuit board;
  an encoder disc operably coupled to the stern, the encoder disc being positioned between the control panel and the printed circuit board, the encoder disc defining a plurality of teeth; and
  a plurality of sensors mounted on the printed circuit board adjacent the encoder disc such that the plurality of sensors detect the motion of the plurality of teeth to determine the angular position of the stem.

13. The cooking appliance of claim 12, wherein the sensor assembly comprises a first sensor and a second sensor, the first sensor producing a first pulse signal as the plurality of teeth pass through a detection point of the first sensor and the second sensor producing a second pulse signal as the plurality of teeth pass through a detection point of the second sensor, the first pulse signal being approximately 90 degrees out of phase from the second pulse signal.

14. The cooking appliance of claim 13, wherein the sensor assembly further comprising a third sensor, the third sensor configured for detecting an indicator feature, the indicator feature corresponding with a zero position of the control knob.

15. The cooking appliance of claim 14, wherein the encoder disc is made from a material which is detectable by the first, second, and third sensors and is configured with a plurality of apertures allowing for the passage of airflow through the control knob assembly.

16. The cooking appliance of claim 14, wherein the first, second, and third sensors are each infrared optical sensors comprising an emitter that emits an infrared light beam and a detector that receives the infrared light beam and detects the presence and absence of a tooth of the plurality of teeth of the encoder disc at a detection point of the sensor.

17. The cooking appliance of claim 12, further comprising a lighting assembly mounted on the printed circuit board and configured to selectively illuminate a plurality of indicators defined on the control panel.

18. The cooking appliance of claim 17, wherein each of the plurality of indicators is a translucent opening in the control panel, each of the plurality of indicators corresponding to a particular power level selected by the control knob.

19. The cooking appliance of claim 17, wherein the lighting assembly comprises a plurality of light sources, each of the plurality of light sources being configured to illuminate one of the plurality of indicators.

20. The cooking appliance of claim 19, further comprising a light guide positioned between the lighting assembly and the control panel, the light guide configured for directing light from each of the plurality of light sources to a corresponding one of the plurality of indicators.

* * * * *